(12) United States Patent
Pirskanen et al.

(10) Patent No.: US 8,233,431 B2
(45) Date of Patent: Jul. 31, 2012

(54) WCDMA UPLINK HARQ OPERATION DURING THE RECONFIGURATION OF THE TTI LENGTH

(75) Inventors: Juho Pirskanen, Tampere (FI); Karri Ranta-Aho, Espoo (FI); Antti Toskala, Espoo (FI)

(73) Assignee: Nokia Corporation, Espoo (FI)

( * ) Notice: Subject to any disclaimer, the term of this patent is extended or adjusted under 35 U.S.C. 154(b) by 612 days.

(21) Appl. No.: 11/182,430

(22) Filed: Jul. 15, 2005

(65) Prior Publication Data

US 2006/0034285 A1 Feb. 16, 2006

Related U.S. Application Data

(60) Provisional application No. 60/601,462, filed on Aug. 13, 2004.

(51) Int. Cl.
*H04W 4/00* (2009.01)
(52) U.S. Cl. .......................... 370/328; 370/342
(58) Field of Classification Search .................. None
See application file for complete search history.

(56) References Cited

U.S. PATENT DOCUMENTS

| | | | | |
|---|---|---|---|---|
| 5,956,329 | A | 9/1999 | Pernice et al. | 370/336 |
| 6,496,481 | B1 * | 12/2002 | Wu et al. | 370/242 |
| 7,339,949 | B2 | 3/2008 | Suzuki et al. | 370/468 |
| 7,345,999 | B2 * | 3/2008 | Su et al. | 370/231 |
| 2002/0176353 | A1 | 11/2002 | Atlas et al. | 370/203 |
| 2003/0108027 | A1 * | 6/2003 | Kim et al. | 370/345 |
| 2004/0042492 | A1 | 3/2004 | Suzuki et al. | 370/473 |
| 2004/0160925 | A1 | 8/2004 | Heo et al. | 370/335 |
| 2005/0094561 | A1 * | 5/2005 | Raaf | 370/235 |
| 2005/0176437 | A1 * | 8/2005 | Mir | 455/450 |
| 2005/0180449 | A1 * | 8/2005 | Ranta-Aho et al. | 370/437 |
| 2005/0276266 | A1 * | 12/2005 | Terry | 370/394 |
| 2006/0048036 | A1 * | 3/2006 | Miura et al. | 714/758 |
| 2007/0133475 | A1 * | 6/2007 | Peisa et al. | 370/335 |
| 2007/0230516 | A1 * | 10/2007 | Torsner et al. | 370/538 |
| 2008/0028270 | A1 * | 1/2008 | Parkvall et al. | 714/748 |

FOREIGN PATENT DOCUMENTS

| | | |
|---|---|---|
| CN | 1402463 A | 3/2003 |
| TW | 200406098 A | 4/2004 |
| WO | WO-95/21508 | 8/1995 |

OTHER PUBLICATIONS

Samsung; HARQ operation at TTI reconfiguration; 3GPP TSG RAN2#46; Scottsdale, Arizona, USA, Feb. 14-18, 2005; R2-050350.
Lucent Technologies; 2ms/10ms TTI switching; 3GPP TSG-RAN WG2#46; Scottsdale, AZ, USA; Feb. 14-18, 2005; R2-050566.
"On the use of a short TTI for enhanced uplink DCH", Ericsson, TSG-RAN WG1 #31, R1-030211, Feb. 18-21, 2003, 5 pgs.

* cited by examiner

*Primary Examiner* — Anh-Vu H Ly
*Assistant Examiner* — Tito Pham
(74) *Attorney, Agent, or Firm* — Harrington & Smith

(57) ABSTRACT

A method for minimizing the loss of data and ensuring that large delays do not occur during reconfigurations of an uplink transmission time interval (TTI) length of a WCDMA High Speed Packet Uplink Access (HSUPA) air interface, wherein the reconfiguration of an uplink TTI length is delayed until all pending retransmissions are successfully transmitted or until the maximum number of transmissions is reached. The transmission of new packets during this time period is prevented. However, pending retransmissions are allowed to occur. After the UE has received an ACK/NACK for each HARQ process, or until the specific maximum number of re-transmissions is reached, the UE starts transmitting with a new uplink TTI length.

22 Claims, 10 Drawing Sheets

WCDMA UPLINK HARQ OPERATION DURING THE RECONFIGURATION OF THE TTI LENGTH

RELATED APPLICATIONS

This application claims priority from U.S. Provisional Application Ser. No. 60/601,462 filed Aug. 13, 2004.

BACKGROUND OF THE INVENTION

1. Field of the Invention

The present invention generally relates to the Third Generation Partnership Project (3GPP) specification of the Universal Mobile Telecommunications System (UMTS) Terrestrial Radio Access (UTRA) and, more particularly to, a method for minimizing the loss of data and ensuring that large delays do not occur during reconfigurations of an uplink transmission time interval (TTI) length of a WCDMA High Speed Packet Uplink Access (HSUPA) air interface.

2. Description of the Related Art

A key element of the HSUPA feature is high speed WCDMA Base Station (i.e., Node B) level Hybrid Automatic Repeat requests (HARQ), where the Node B immediately acknowledges the reception of transmitted packets at each uplink transmission time interval (TTI) subsequent to any propagation delays, such as $T_{prop}$, as illustrated in FIG. 1. In this case, the acknowledgment is either positive or negative. In instances where the packets transmitted at the uplink TTI were incorrectly received, the user equipment (UE) either retransmits the exact same number of bits in the packet or the exact incremental redundancy bits for the same information to be transmitted.

The developers of the 3GPP standard have agreed to established two different uplink TTI lengths (i.e., 2 ms and 10 ms) for the HSUPA air interface, and that the uplink TTI length is to be semi-static, i.e. the change of a HSUPA radio link (or air interface) TTI length requires a synchronous radio link reconfiguration procedure that is controlled by a radio network controller (RNC).

Typically, there are pending transmissions when a change of the uplink TTI length occurs, i.e. the Node B has received a packet incorrectly and has requested a retransmission of the packet. In this case, prior to retransmission of the packet occurring, the uplink TTI length is changed. As a result, a loss of data and/or large delays due to retransmissions by higher protocol layers will occur upon reconfiguration of the uplink TTI length because the packets with pending retransmissions are lost in the physical layer. At present, the 3GPP standard fails to address system behavior during uplink TTI length reconfigurations. Accordingly, there is a need to minimize the loss of data and/or ensure large delays do not occur when the uplink TTI length of the HSUPA air interface is reconfigured.

SUMMARY OF THE INVENTION

The invention is a method for minimizing the loss of data and ensuring that large delays do not occur during reconfigurations of an uplink transmission time interval (TTI) length of a WCDMA High Speed Packet Uplink Access (HSUPA) air interface. In accordance with the present invention, there are multiple techniques for ensuring that a system responds reasonably in the event of a change of the uplink TTI length. For example, a key element of Hybrid Automatic Repeat Request (HARQ) is that the transmission energy of unsuccessfully received packets is stored in a receiving device as soft symbols and a request for retransmission is sent as feedback information from the receiving device to the transmitting device. These soft symbols, which are obtained from different attempts to transmit the same packet, can be combined to create a single instance of the data packet. As a result, if a specific packet is transmitted twice and incorrectly received both times, then the incorrectly received packets can potentially be combined into a single correct packet. In one aspect of the present invention, the transmitted energy in the incorrectly received packets is not utilized, i.e., the soft symbols are not combined. In another aspect of the invention, the energy of the incorrectly received packets sent prior to the change in the uplink TTI length is used, i.e., the soft symbols of each transmission attempt are combined.

An incremental redundancy scheme is used to create a soft symbol. For instance, even though a transmitter transmits only hard bits (0 and 1, which are typically mapped to −1 and +1 by a radio), the receiver does not make a "hard" decision on whether it received −1 or +1. Rather, a decision is made with respect to how close the received bit is to −1 or +1. In accordance with the invention, the soft symbols of multiple transmissions can be summed together. As a result, the receiver can accumulate the transmitted energy from multiple transmissions. Here, the transmitter utilizes error correcting code and cyclic redundancy checking (CRC) check part in the transmission and in the receiver. After each attempt to transmit, the decoder makes a "hard" decision for each soft symbol. In addition, after decoding the received transmission, if the CRC check indicates that the data is correct, then the soft symbols can be cleared and the received, decoded packet can be relayed to the RNC. With incremental redundancy schemes, the transmitter may partially transmit different bits in each transmission. In addition, the receiver has prior knowledge of which bits should be transmitted in each attempted transmission.

In an additional aspect of the present invention, the reconfiguration of the uplink TTI length is delayed until all pending retransmissions are successfully transmitted or until the maximum number of transmissions is reached. Here, no new data is sent during this delay period. As a result, a delay is imparted to the reconfiguration of the uplink TTI length.

In an alternative aspect of the invention, a period of time representing the maximum number of Hybrid Automatic Repeat Request (HARQ) retransmissions is allowed to pass before the uplink TTI length is changed. In addition, the transmission of any new packets during that time period is prevented, but any pending transmissions are allowed to occur.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE EXEMPLARY EMBODIMENTS

Figure 1:
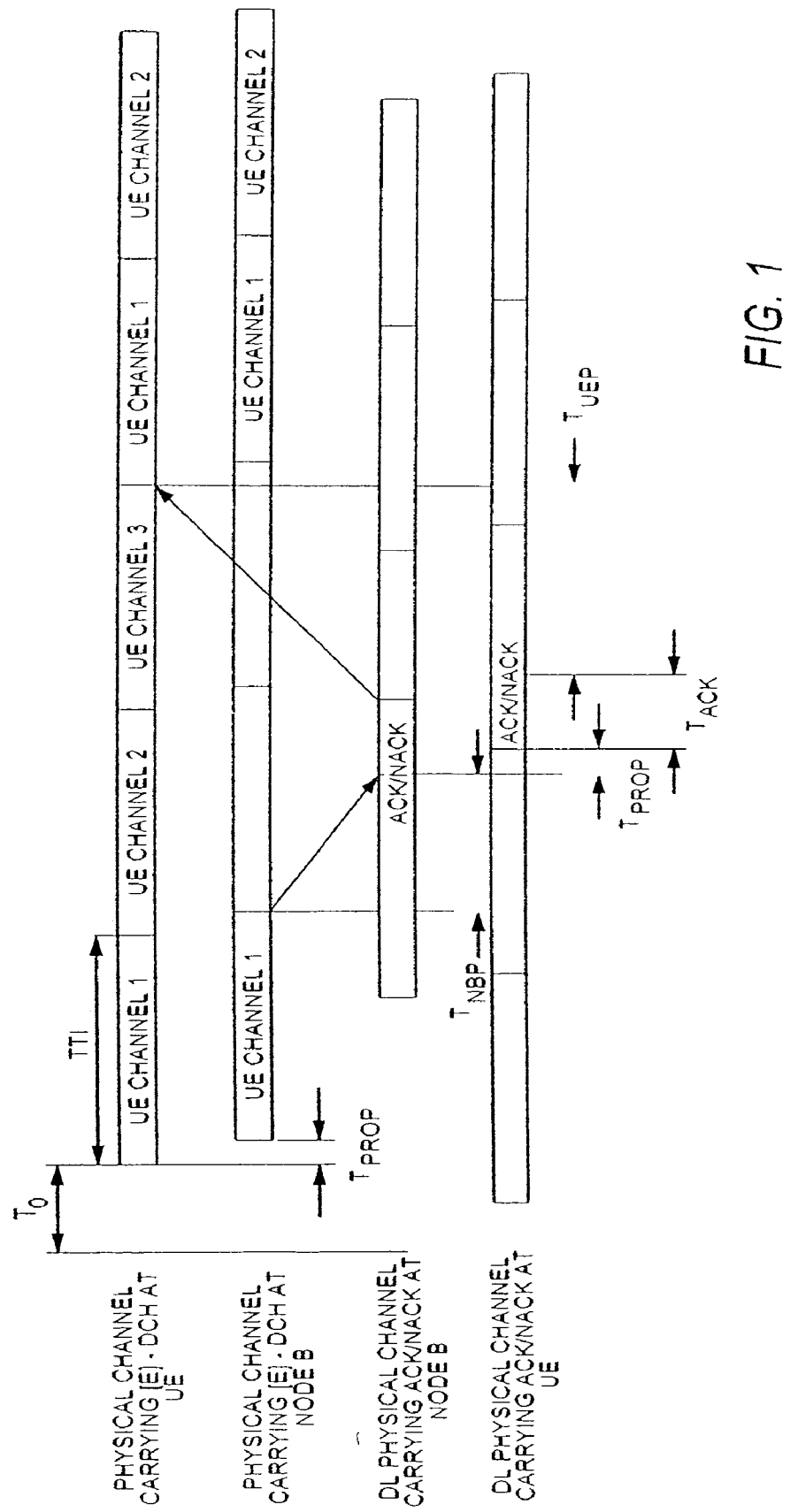
FIG. 1 is an exemplary illustration of a Hybrid Automatic Repeat request (HARQ) timing diagram, where the number of processes (N) equals 3 and the uplink transmission time interval (TTI) equals 10 ms.

The present invention is directed to a method for minimizing the loss of data and/or ensuring that large delays do not occur when the uplink TTI length of a WCDMA High Speed Packet Uplink Access (HSUPA) air interface is reconfigured. In accordance with the present invention, there are multiple techniques for ensuring that a system responds reasonably in the event of a change of the uplink TTI length. For example, a key element of Hybrid Automatic Repeat Request (HARQ) is that the transmission energy of unsuccessfully received packets is stored in a receiving device as soft symbols and a request for retransmission is sent as feedback information from the receiving device to the transmitting device. These soft symbols, which are obtained from different attempts to transmit the same packet, can be combined to create a single instance of the data packet. As a result, if a specific packet is transmitted twice and incorrectly received both times, then the incorrectly received packets can potentially be combined into a single correct packet. In one embodiment of the present invention, the transmitted energy in the incorrectly received packets is not utilized, i.e., the soft symbols are not combined. In another embodiment, the energy of the incorrectly received packets sent prior to the change in the uplink TTI length is used, i.e., the soft symbols of each transmission are combined.

An incremental redundancy scheme is used to create a soft symbol. For instance, even though a transmitter transmits only hard bits (0 and 1, which are typically mapped to −1 and +1 by a radio), the receiver does not make a "hard" decision on whether it received −1 or +1. Rather, a decision is made with respect to how close the received bit is to −1 or +1. In accordance with the invention, the soft symbols of multiple transmissions can be summed together. As a result, the receiver can accumulate the transmitted energy from multiple transmissions. Here, the transmitter utilizes error correcting code and cyclic redundancy checking (CRC) check part in the transmission and in the receiver. After each attempt to transmit, the decoder makes a "hard" decision for each soft symbol. In addition, after decoding the received transmission, if the CRC check indicates that the data is correct, then the soft symbols can be cleared and the received, decoded packet can be relayed to the RNC. With incremental redundancy schemes, the transmitter may partially transmit different bits in each transmission. In addition, the receiver has prior knowledge of which bits should be transmitted in each attempted transmission.

In an embodiment of the present invention, the reconfiguration of the uplink TTI length is delayed until all pending retransmissions are successfully transmitted or until the maximum number of transmissions is reached. Here, no new data is sent during this delay period. As a result, a delay is imparted to the reconfiguration of the uplink TTI length. As expected, if the reconfigurations occur relatively infrequently and there is no immediate requirement to perform the reconfiguration, then the delay is acceptable because the adverse effects of the delay on the overall system performance will be minimal. However, when the uplink TTI length changes from 2 ms to 10 ms due to poor signal coverage, delaying the uplink TTI length reconfiguration becomes impractical because a "drop call" event may occur during the delay time. When the uplink TTI length changes from 10 ms to 2 ms, however, the reconfiguration of the uplink TTI length can be delayed, since this is an event where the problems associated with poor signal coverage do not exist. In an alternative embodiment, a period of time representing the maximum number of Hybrid Automatic Repeat Request (HARQ) retransmissions is allowed to pass before the uplink TTI length is changed. In addition, the transmission of any new packets during that time period is prevented, but any pending transmissions are allowed to occur.

The method of the present embodiment is implemented by using a serving radio network controller (SRNC) to command a synchronous reconfiguration of the uplink TTI length for the user equipment (UE) and the Node B, indicating the connection frame number (CFN) with which the reconfiguration is to take place. In alternative embodiments, the UE and Node B obtain the exact timing for the reconfiguration of the uplink TTI length via alternative methods that are established by the 3GPP.

At the issuance of a set connection frame number (CFN) command, the UE stops transmitting any new data packets with the old uplink TTI length, but continues to transmit any pending retransmissions with the old uplink TTI length until the successful transmittal of all the packets, i.e., the UE has received a positive acknowledgement (ACK) for each HARQ process, or until a specific maximum number of re-transmissions is reached. After this event has occurred, the UE can start transmitting with a new uplink TTI length.

At the set CFN, the Node B continues to operate in a normal manner with the old uplink TTI length until each HARQ process has terminated its pending retransmission by either successfully receiving the packet after retransmission(s) or by reaching the maximum number of retransmissions. After the HARQ processes are terminated, the Node B begins receiving with a new uplink TTI length. In the case where there are no pending retransmissions for any of the HARQ processes, the Node B immediately begins to wait for transmissions with the new uplink TTI length.

It should be noted that the use of the method of the present embodiment is inappropriate when multiple Node Bs are participating to process soft handover (SHO) branches of the UE. This is because another Node B may receive the last packet that is correctly sent with an old uplink TTI length, while the other Node B has missed the packet and thus, will still request re-transmission of the packet with the old uplink TTI length. Here, the UE will change the uplink TTI length. However, the other Node B that is still requesting the retransmission of the packet(s) will fail to decode the next transmission from the UE.

In an alternative embodiment of the invention, the uplink TTI length is immediately changed at the indicated activation time of the connection frame number (CFN) that is located in a received reconfiguration message. Here, the Node B clears its HARQ buffers, and the UE begins sending new packets with a new uplink TTI length at the indicated activation time. As a result, all of the packets awaiting re-transmission will be lost, but potentially recovered by higher layer retransmission protocols.

Figure 2:
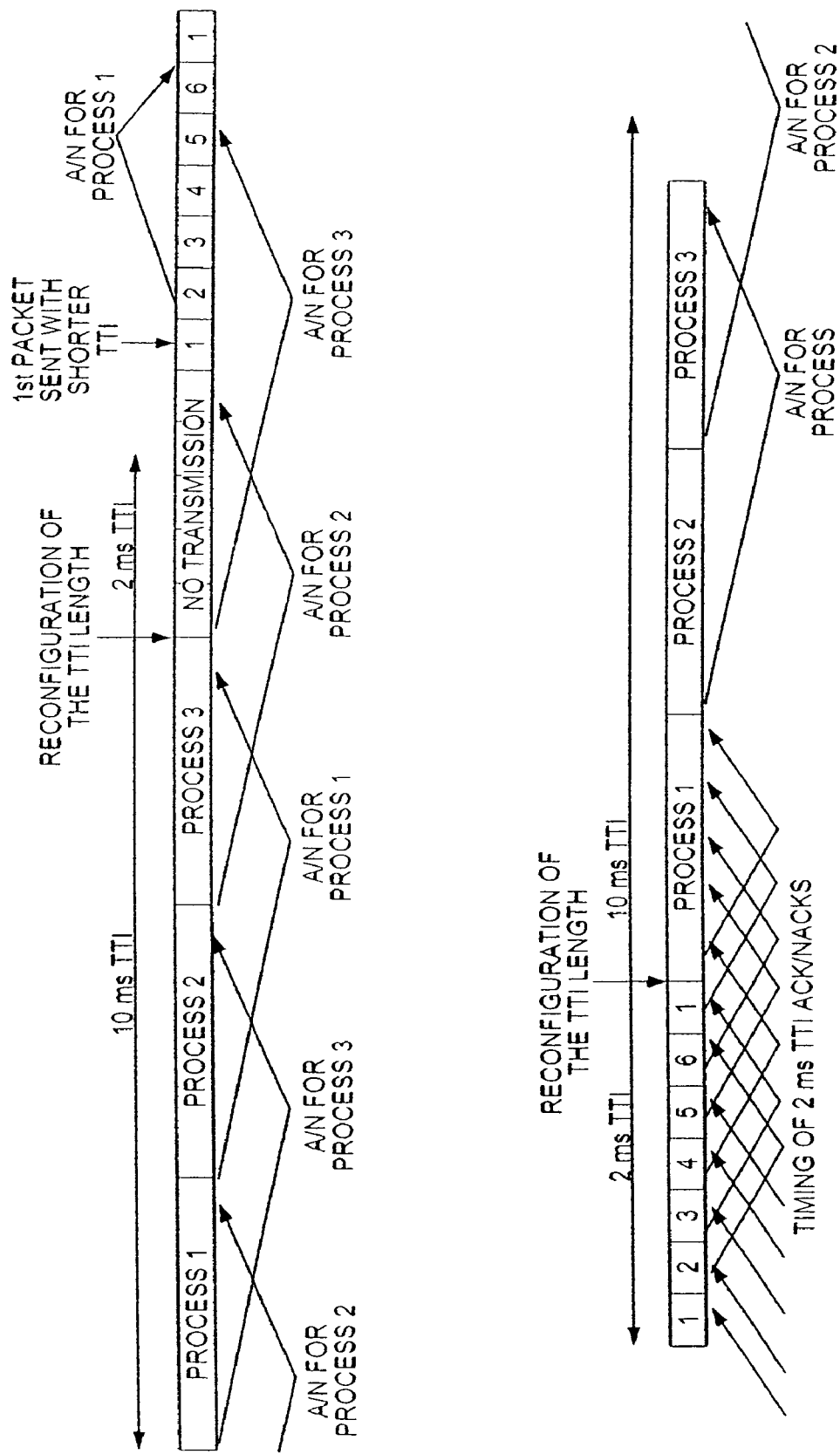
FIG. 2 is an illustration of a method for reconfiguring the uplink TTI length in accordance with an embodiment of the present invention.

Turning now to FIG. 2, illustrated therein is a method for reconfiguring the uplink TTI length in accordance with an embodiment of the present invention. Here, the uplink TTI length is immediately changed when a reconfiguration command is received; that is, the Node B clears its HARQ buffers. However, the ACK/NACKs of each transmission is subsequently sent for the first uplink TTI length transmissions. As a result, the UE is permitted to know which packets were correctly and/or incorrectly received. Based on this information, the UE sends the data that was not successfully received in the Node B using a new initial transmission (and possible subsequent retransmissions) with the new uplink TTI length. As a result, packets are not lost in the physical layer. However, the energy of the first transmissions at the old uplink TTI length is lost.

In accordance with the present embodiment, when changing from a 10 ms uplink TTI length to a 2 ms uplink TTI length, the UE is required to refrain from transmitting any packets at the new uplink TTI length for roughly (N−1)*10 ms. This is to avoid faster ACK/NACK transmissions of the shorter uplink TTI length from overlapping with the pending ACK/NACKs of the longer uplink TTI lengths. In this case, N is the number of HARQ processes for the 10 ms uplink TTI length. Typically, when changing from a 2 ms uplink TTI length to a 10 ms uplink TTI length, ACK/NACK overlaps do not occur because the N for a 2 ms uplink TTI length is low enough (e.g. 7) so that all ACK/NACKs can be received before the first ACK/NACK for the first 10 ms TTI data packet is to be received. Hence, after the reconfiguration occurs, the UE can immediately begin to transmit with a 10 ms uplink TTI length and receive the 2 ms ACK/NACKs that remains in the queue before the first 10 ms ACK/NACK reaches the UE. As a result, an overlap between the ACK/NACKs of different TTI lengths is prevented from occurring.

With additional reference to FIG. 2, the method of the present embodiment is implemented by using a serving radio network controller (SRNC) to command a synchronous reconfiguration of the uplink TTI length for the user equipment (UE) and a Node B, indicating the connection frame number (CFN) with which the reconfiguration is to take place. In alternative embodiments, the UE and Node B obtain the exact timing for the reconfiguration of the uplink TTI length via alternative methods that are established by the 3GPP.

In accordance with the method of the present embodiment, in order to reconfigure the uplink TTI length from 2 ms to 10 ms, the UE immediately begins transmitting packets with the 10 ms uplink TTI length when the reconfiguration occurs. However, the ACK/NACKs of the packets that were previously sent at the 2 ms uplink TTI length are still received in the same manner as if the reconfiguration did not take place. Here, it is reasonable to expect that the number of HARQ processes for the 2 ms and 10 ms uplink TTI lengths are established so as to prevent the ACK/NACK transmissions from overlapping.

From the received ACK/NACKs of the 2 ms TTI packets the UE ascertains which data was incorrectly received. As a result, the UE resends that data, but with the 10 ms uplink TTI as if it were new data.

Next, the Node B immediately begins to receive data at the 10 ms uplink TTI length, while still normally transmitting ACK/NACKs for previously received packets at the 2 ms uplink TTI length.

After the Node B transmits the last ACK/NACK 2 ms uplink TTI length, it will clear the HARQ buffers for those HARQ processes sent at the 2 ms TTI length that still have retransmissions pending. Alternatively, the Node B will use accumulated energy of the packets (i.e., the soft symbols) sent at the 2 ms TTI length with the retransmissions of the same data at 10 ms uplink TTI lengths.

In accordance with the present embodiment of the invention, in order to reconfigure the uplink TTI length from 10 ms to 2 ms, the UE is prevented from transmitting packets for a duration derived from the number of HARQ processes for both uplink TTI lengths so that the ACK/NACK of the first packet sent at the 2 ms uplink TTI length only arrives at the UE after the ACK/NACK of the last packet sent at the 10 ms uplink TTI length. In all other aspects, the present contemplated embodiment is identical to the embodiment described above with respect to reconfiguration of the uplink TTI lengths from 2 ms TTI to 10 ms.

Figure 3:
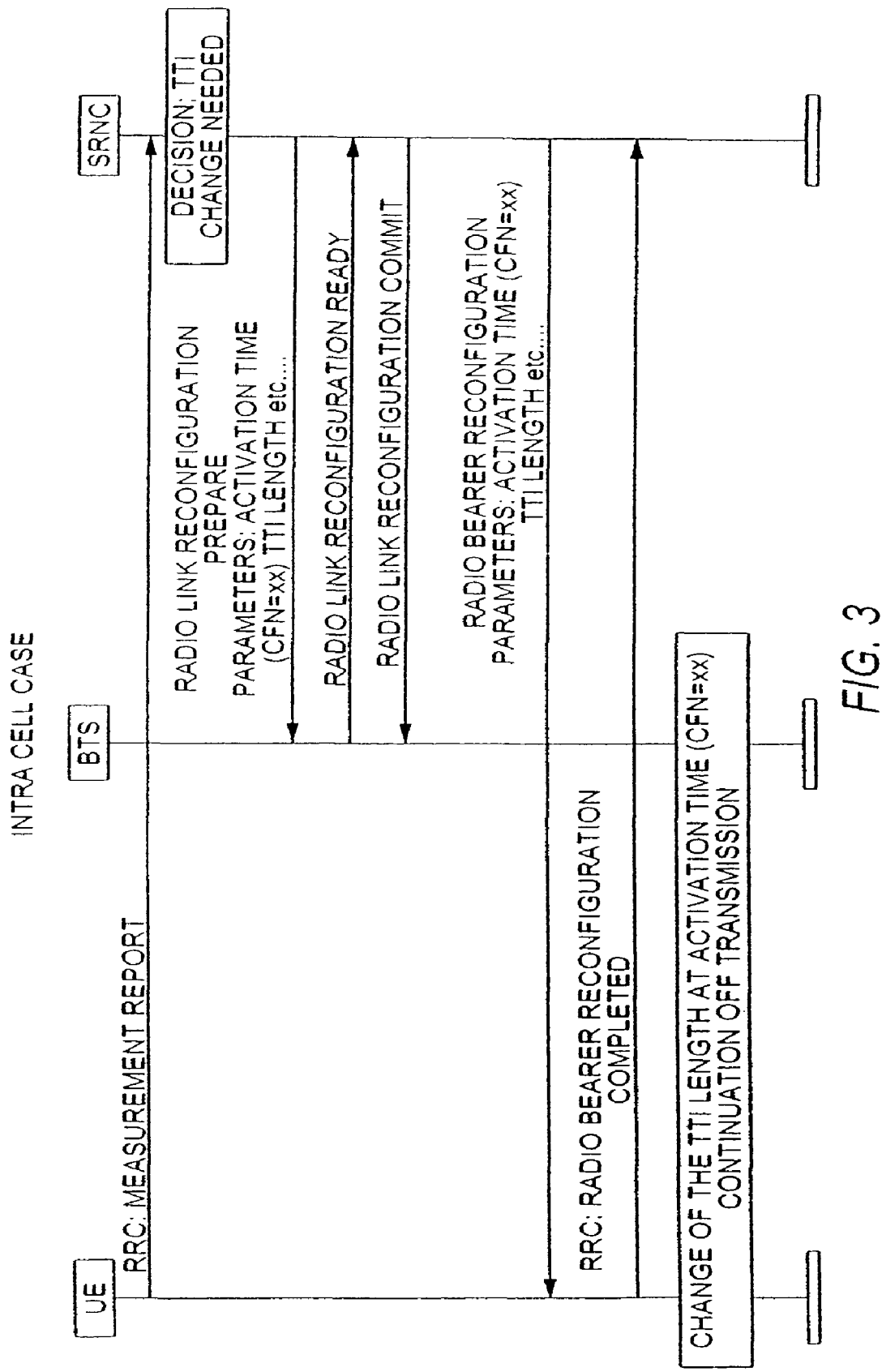
FIG. 3 is an exemplary signalling flow for a typical case when a change of the uplink TTI length is to be performed.
Figure 4:
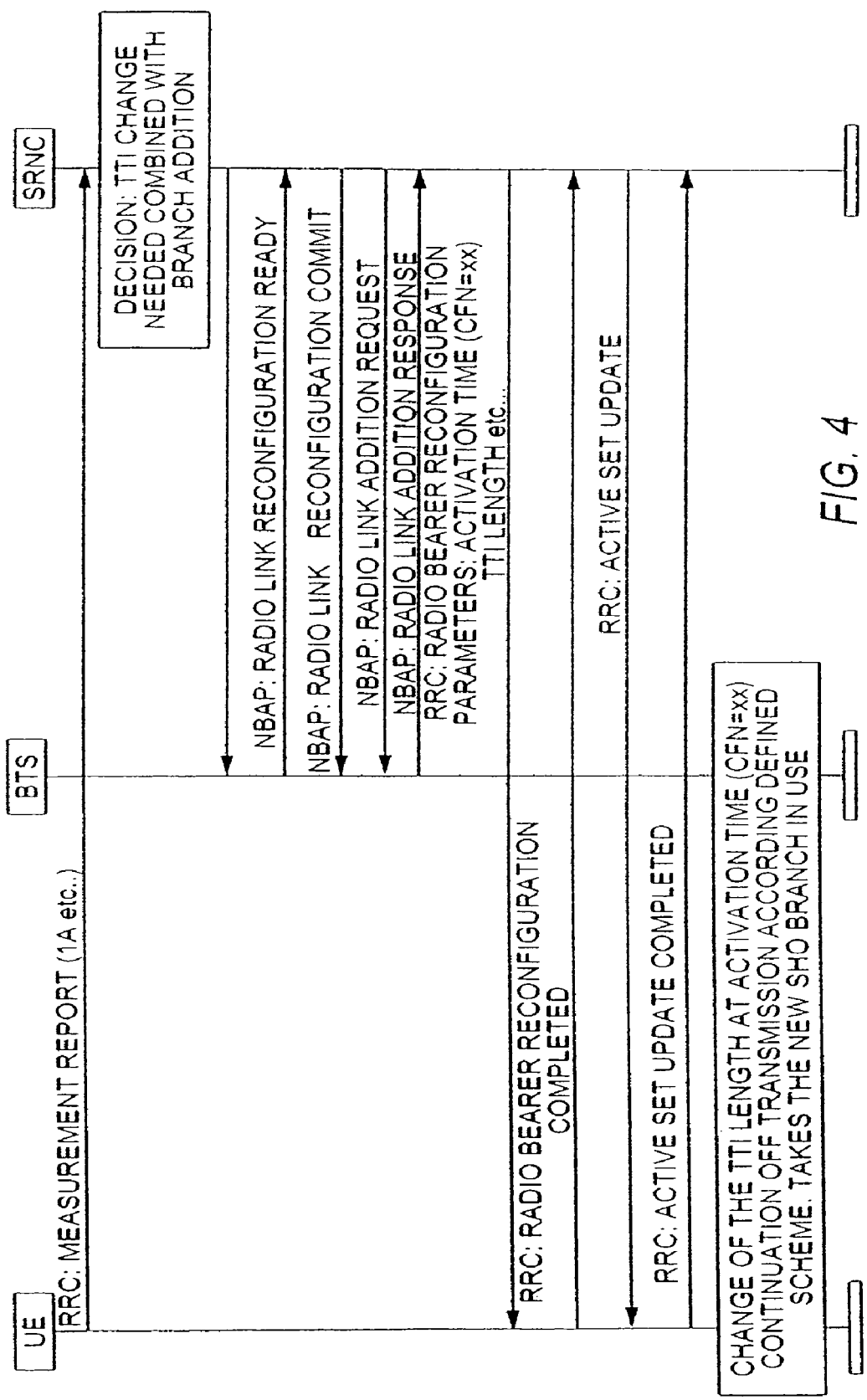
FIG. 4 is an alternative exemplary signalling flow for a typical case when a change of the uplink TTI length is to be performed.
Figure 5:
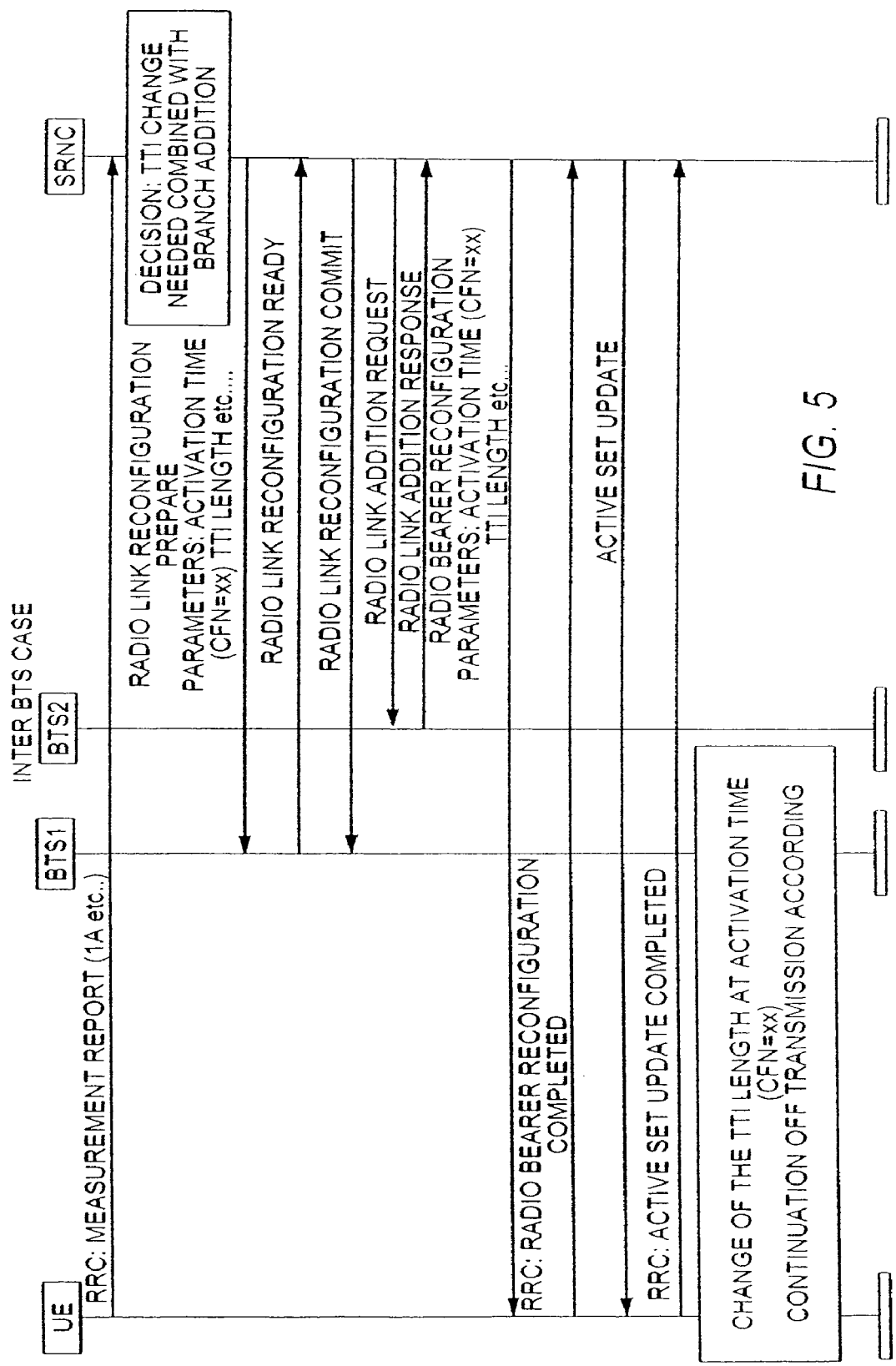
FIG. 5 is another exemplary signalling flow for a typical case when a change of the uplink TTI length is to be performed.

An exemplary signalling flow for a typical case when the change of the uplink TTI length is to be performed is illustrated in FIG. 3. Shown therein is an intra cell communication. The illustrated signalling flow is not exhaustive and other cases of signal flow are definable, e.g. intra BTS radio link addition as shown in FIG. 4, inter BTS radio link addition as shown in FIG. 5, or branch deletion and branch replacement.

Figure 6:
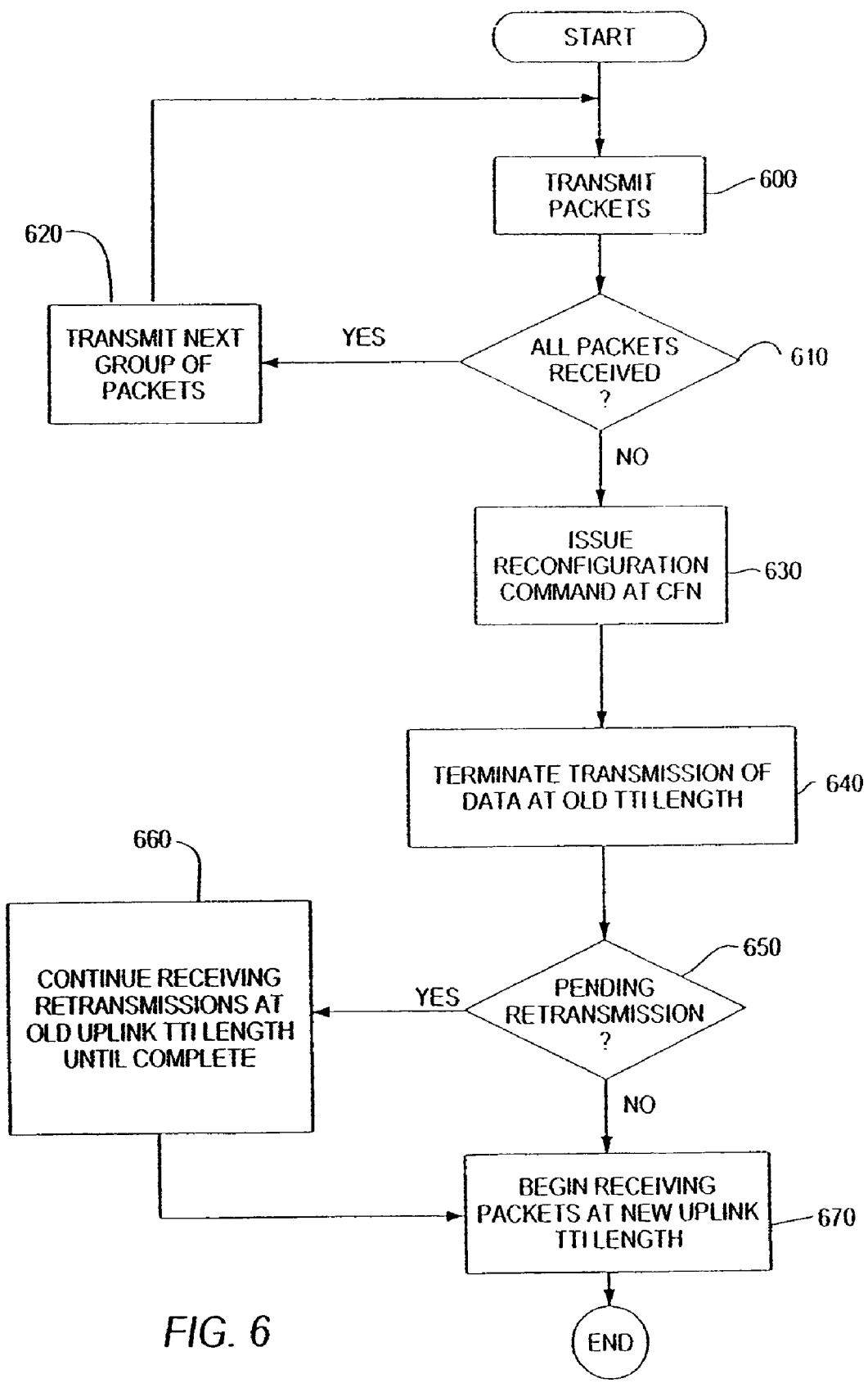
FIG. 6 is a flow chart illustrating the steps of the method for changing the uplink TTI length from 2 ms to 10 ms in accordance with the invention.

FIG. 6 is a flow chart illustrating the steps of the method for changing the uplink TTI length from 2 ms to 10 ms in accordance with the method of the invention. With reference to FIG. 6, the method of the invention is implemented by transmitting packets from a UE to a Node B, as indicated in step 600. An ACK/NACK for each packet that is transmitted is sent to the UE, as indicated in step 610. A check is performed to determine whether a reconfiguration of the uplink TTI length command has issued, as indicated in step 620. If a TTI length command has issued, then a check is performed to determine whether a packet has been incorrectly received, as indicated in step 630. If all packets were correctly received, a return to step 600 occurs in order to continue transmitting packets. However, if a packet is not correctly received, i.e., a NACK is received by the UE, a command is issued from a serving radio network controller (SRNC) to cause a synchronous reconfiguration of the uplink TTI length for the user equipment (UE) and the Node B, indicating the connection frame number (CFN) with which the reconfiguration is to take place and the transmission of new data at the 2 ms uplink TTI length at the commanded connection frame number (CFN) is terminated, as indicated in step 640. In alternative embodiments, the UE and Node B obtain the exact timing for the reconfiguration of the uplink TTI length via alternative methods that are established by the 3GPP.

Next, a check is performed to determine whether all transmitted data was correctly received using the ACK/NACKs of the packets transmitted at the 2 ms uplink TTI length, as indicated in step 650. If there are pending retransmissions at the 2 ms uplink TTI length, then the ACK/NACKs of the packets that were previously sent at the 2 ms uplink TTI length are still received in the same manner as if a reconfiguration has not taken place, as indicated in step 660. Here, it is reasonable to expect that the number of HARQ processes for the 2 ms and 10 ms uplink TTI lengths are established so as to prevent the ACK/NACK transmissions from overlapping. As a result, the Node B will wait before beginning to receiving data at the 10 ms uplink TTI length, until all the ACK/NACKs for previously received packets at the 2 ms uplink TTI length are transmitted, as indicated in step 670.

After the Node B transmits the last ACK/NACK 2 ms uplink TTI length, it will clear the HARQ buffers for those HARQ processes sent at the 2 ms TTI length that still have retransmissions pending. Alternatively, the Node B will use the accumulated energy of the packets (i.e., the soft symbols) sent at the 2 ms TTI length with the retransmissions of the same data at 10 ms uplink TTI lengths.

In accordance with the present embodiment of the invention, in order to reconfigure the uplink TTI length from 10 ms to 2 ms, the UE is prevented from transmitting packets for a duration derived from the number of HARQ processes for both uplink TTI lengths so that the ACK/NACK of the first packet sent at the 2 ms uplink TTI length only arrives at the UE after the ACK/NACK of the last packet sent at the 10 ms uplink TTI length.

Figure 7:
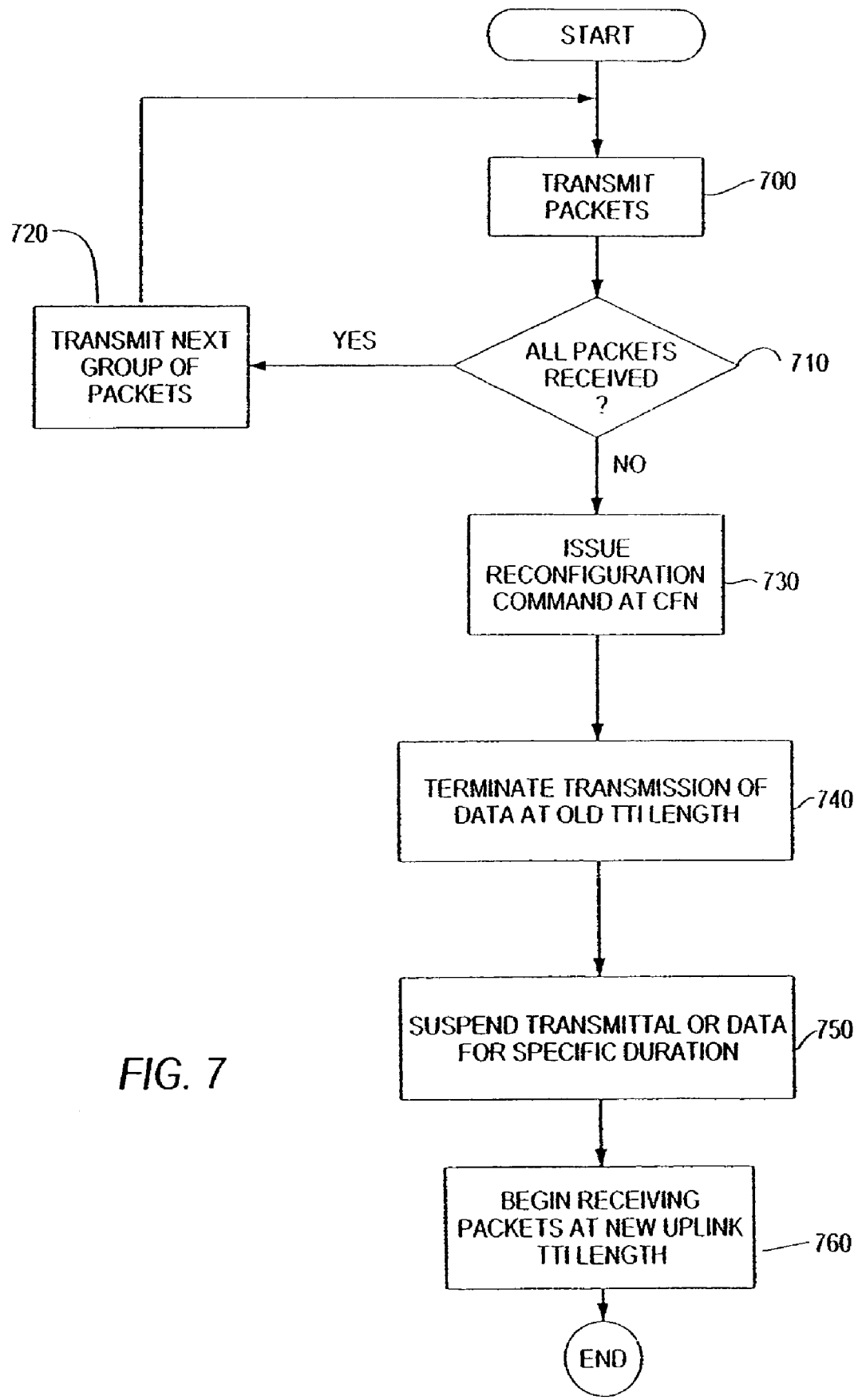
FIG. 7 is a flow chart illustrating the steps of the method for changing the uplink TTI length from 10 ms to 2 ms in accordance with the invention.

FIG. 7 is a flow chart illustrating the steps of the method for changing the uplink TTI length from 10 ms to 2 ms in accordance with the present embodiment of the invention. With reference to FIG. 7, the method of the invention is implemented by transmitting packets from a UE to a Node B, as indicated in step 700. An ACK/NACK for each packet that is transmitted is sent to the UE, as indicated in step 710. A check is performed to determine whether a reconfiguration of the uplink TTI length command has issued, as indicated in step 720. If a TTI length command has issued, then a check is performed to determine whether a packet has been incorrectly received, as indicated in step 730. If all packets were correctly received, a return to step 700 occurs in order to continue transmitting packets. However, if a packet is not correctly received, i.e., a NACK is received by the UE, a command is issued from a serving radio network controller (SRNC) to cause a synchronous reconfiguration of the uplink TTI length for the user equipment (UE) and the Node B, indicating the connection frame number (CFN) with which the reconfiguration is to take place and the transmission of new data at the 2 ms uplink TTI length at the commanded connection frame number (CFN) is terminated, as indicated in step 740. In alternative embodiments, the UE and Node B obtain the exact timing for the reconfiguration of the uplink TTI length via alternative methods that are established by the 3GPP.

Next, the transmittal of packets from the UE is suspended for a duration derived from the number of HARQ processes for both uplink TTI lengths, as indicated in step 750. After the Node B transmits the last ACK/NACK 10 ms uplink TTI length, it will clear the HARQ buffers for those HARQ processes sent at the 10 ms TTI length that still have retransmissions pending. As a result, the Node B immediately begins to receive data at the 2 ms uplink TTI length, while still normally transmitting ACK/NACKs for previously received packets at the 2 ms uplink TTI length, as indicated in step 760

Figure 8:
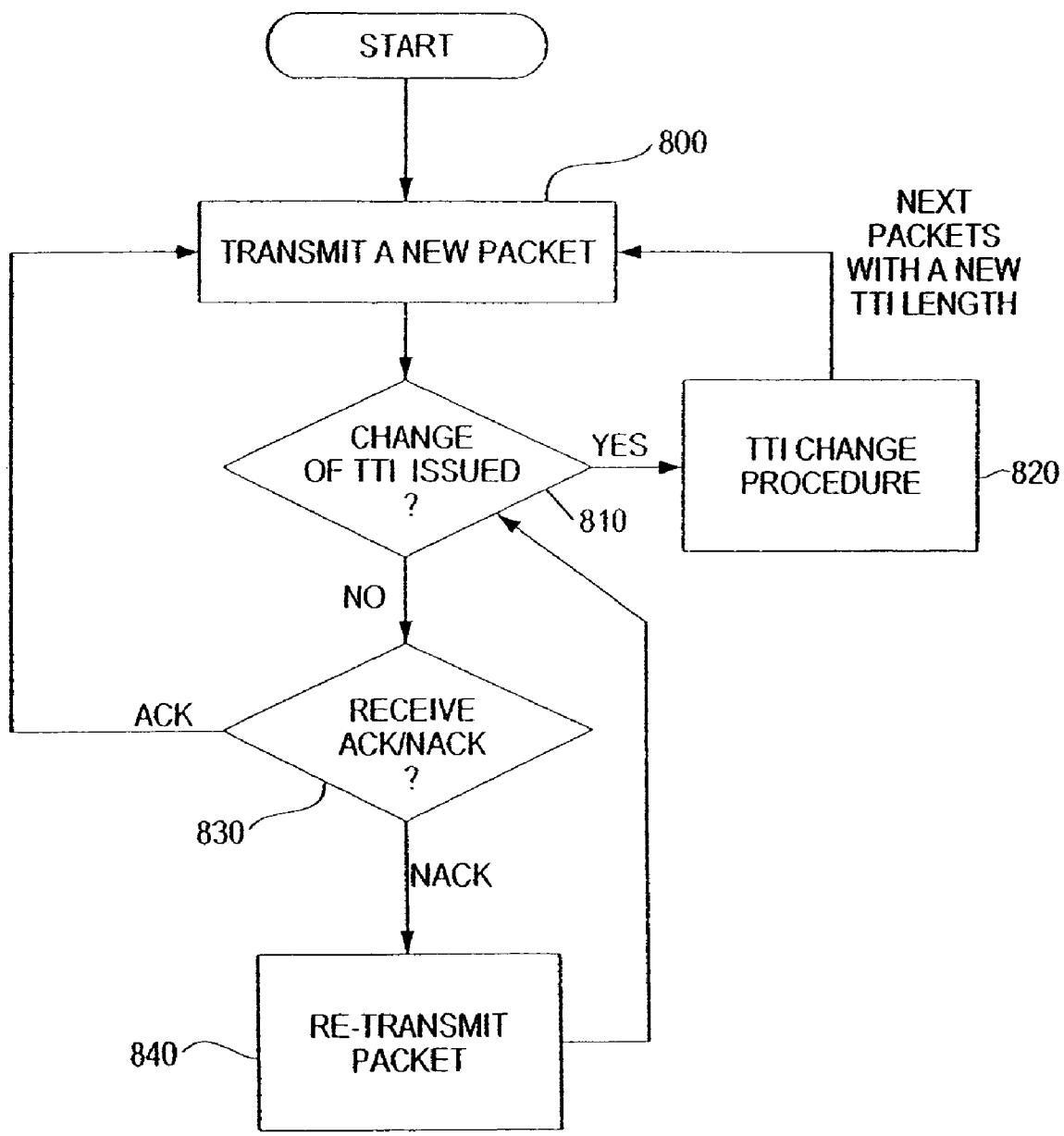
FIG. 8 is a flowchart illustrating the steps associated with a single HARQ process.

FIG. 8 is a flowchart illustrating the steps associated with a single HARQ process. More specifically, FIG. 8 illustrates how multiple HARQ processes (e.g., UE channels) operate in order to transmit data in a single process when other HARQ processes await the transmittal of an ACK/NACK. In this case, the change of the TTI length will occur at the same time for all HARQ processes. In the preferred embodiment, the determination of whether to change the TTI length is performed immediately prior to performing a decision whether to transmit a data packet or immediately after the data decision to transmit the packet is performed.

With reference to FIG. 8, a new data packet is transmitted, as indicated in step 800. Next, a check is performed to determine whether a change of the uplink TTI length command has issued, as indicated in step 810. If a change of the uplink TTI length command has issued, an uplink TTI length change procedure is initiated to change the uplink TTI length for packets that are subsequently transmitted, as indicated in step 820. A return to step 800 then occurs, where subsequent data packets are transmitted with a new uplink TTI length.

If a change of the uplink TTI length command has not issued, then a check is performed to determine whether an ACK/NACK has been received, as indicated in step 830. If a NACK has been received, then the data packet is retransmitted, as indicated in step 840. If an ACK has been received, then a return to step 600 occurs, where additional data packets are transmitted.

Figure 9:
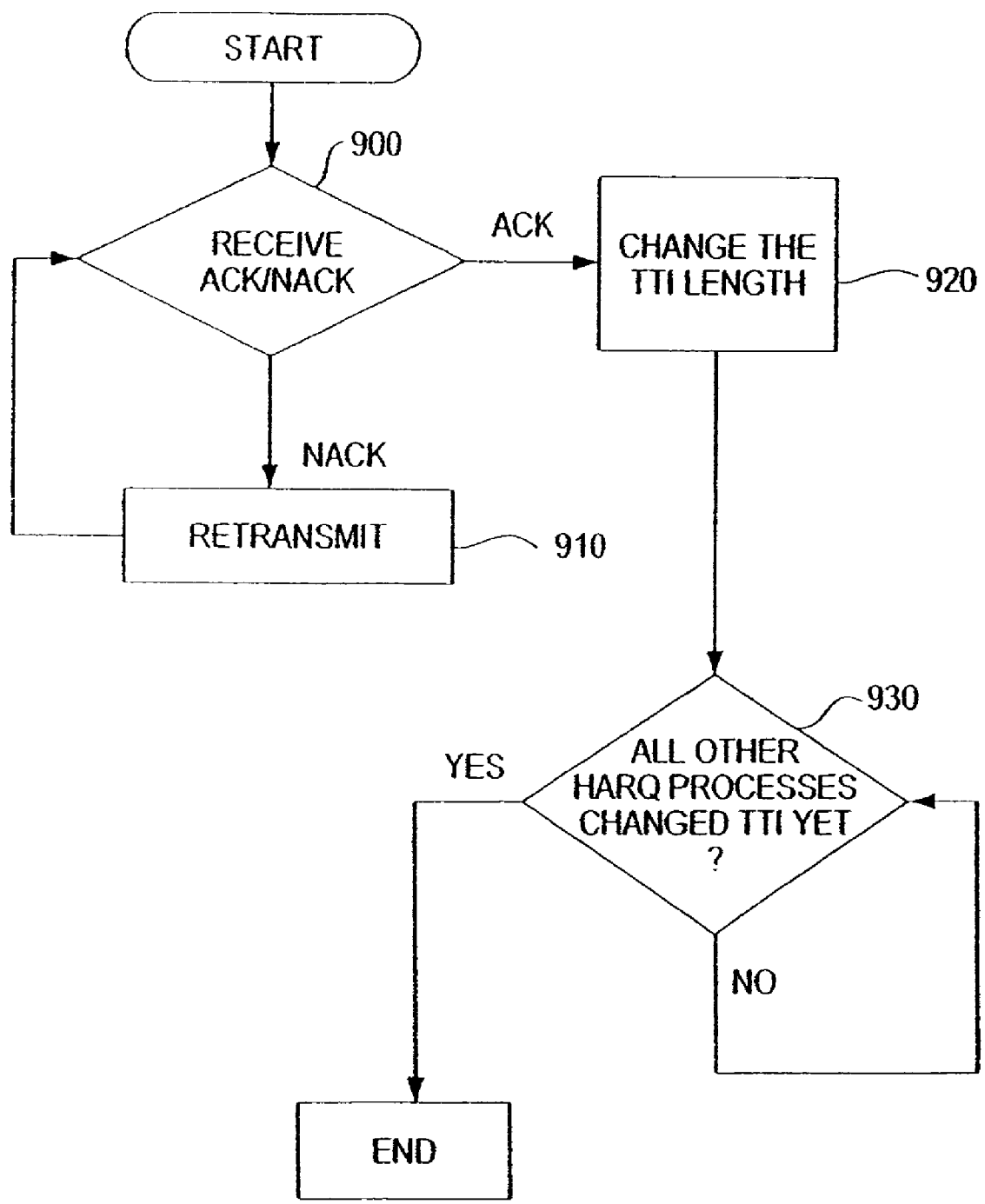
FIG. 9 is a flowchart illustrating the steps associated with an uplink TTI length change procedure of FIG. 8.

FIG. 9 is a flowchart illustrating the steps associated with an uplink TTI length change procedure of FIG. 8. With reference to FIG. 9, the uplink TTI length change procedure is implemented by checking to determine whether an ACK/NACK has been received, as indicated in step 900. If a NACK has been received, then the data packet is retransmitted, as indicated in step 910. If an ACK is received, then a change of the uplink TTI length command is issued, as indicated in step 920.

Next, a check is performed to determine whether a change of the uplink TTI length for all HARQ processes has occurred, as indicated in step 930. If the uplink TTI length for all HARQ processes has not changed, then all the HARQ processes are continually checked until the uplink TTI length for all the processes is changed. This "continual loop" is required to ensure that one HARQ process does not transmit with a new uplink TTI length, while another HARQ process transmits with an old uplink TTI length.

Figure 10:
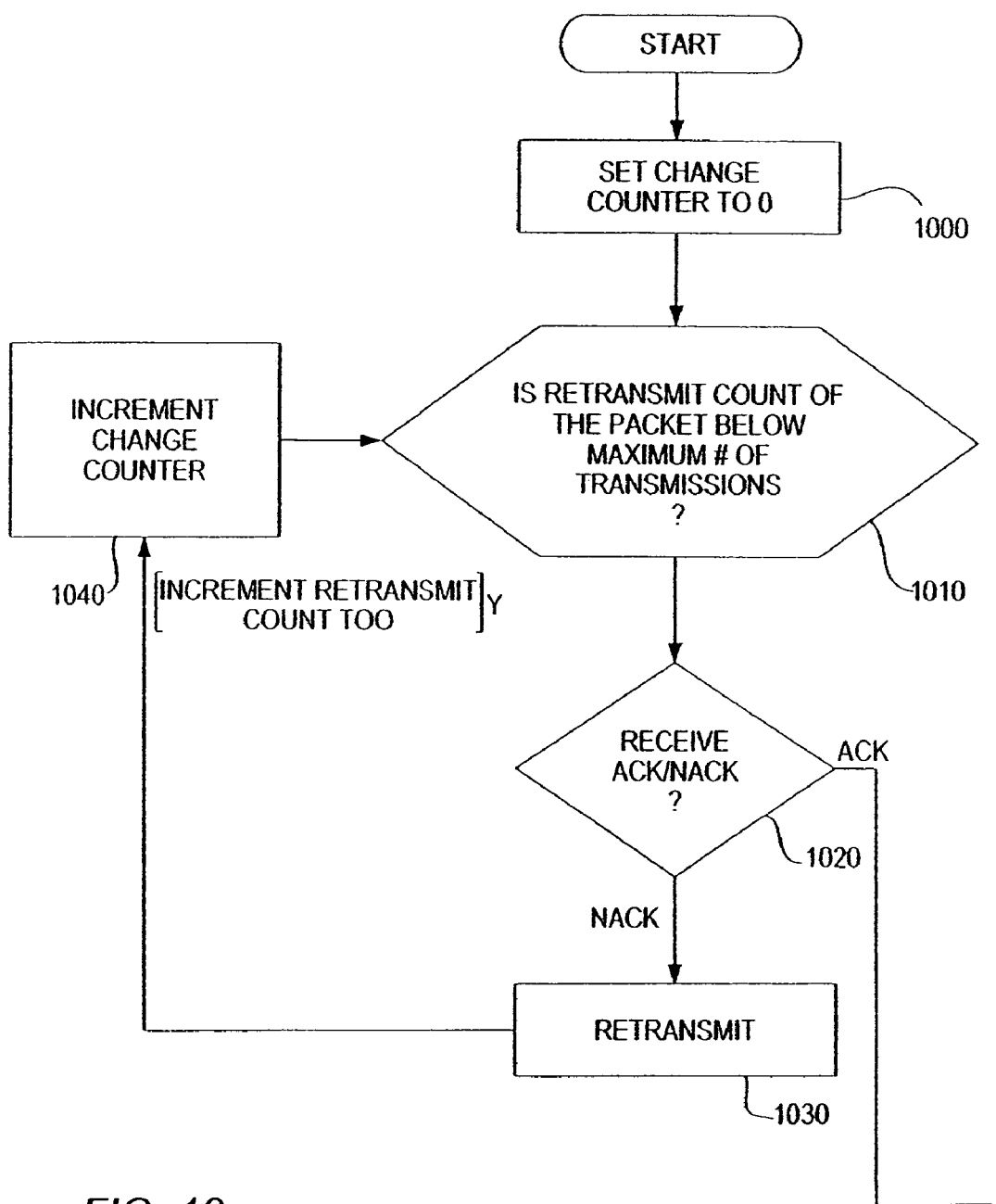
FIG. 10 is a flow chart illustrating the steps associated with an alternative uplink TTI length change procedure.
Figure 10:
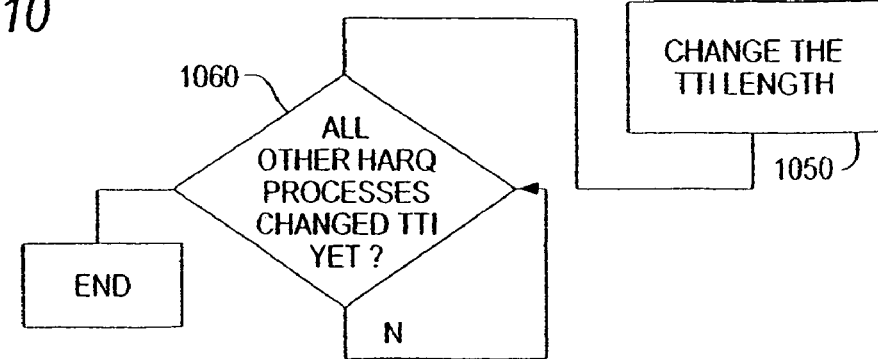

FIG. 10 is a flow chart illustrating the steps associated with an alternative uplink TTI length change procedure. With specific reference to FIG. 10, the uplink TTI change length procedure is implemented by setting a change counter to zero, as indicated in step 1000. A check is then performed to determine whether a retransmit count of a data packet is below a predetermined maximum number of transmissions, as indicated in step 1010. It should be noted that data packet retransmissions that occur prior to the uplink TTI change command are also counted as part of the retransmit count.

If the retransmit count is below a predetermined maximum number of transmissions, then a check is performed to determine whether a NACK has been received, as indicated in step 1020. Naturally, it will be appreciated that if the retransmit counter is above the predetermined maximum number of transmissions, then NACKs are not transmitted, as indicated in step 1025.

Upon receiving the NACK, the data packet is retransmitted, as indicated in step 1030. The change counter is then incremented, as indicated in step 1040. Here, the retransmit count of the data packet is also incremented, where a return to step 1010 occurs to perform the check to determine whether the retransmit count of the data packet is below the predetermined maximum number of transmissions.

On the other hand, if an ACK is received at step 1020, then a change of the uplink TTI length command is issued, as indicated in step 1050. A check is then performed to determine whether a change of the uplink TTI length for all HARQ processes has occurred, as indicated in step 1060. If the uplink TTI length for all HARQ processes has not changed, then all the HARQ processes are continually checked until the uplink TTI length for all the processes is changed.

The straight forward "data-loss" approach (i.e., clear the HARQ buffers in the Node B and continue transmitting from the UE as if there are no pending retransmissions) is the simplest way to reconfigure the uplink TTI length. However, this technique causes the loss of data and relies on RLC/TCP layer retransmissions which can result in a high level of delays. Use of the method of the present invention produces a result that is seamless, without an associated loss off data. However, the level of processing complexity and costs are increased.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   transmitting first data packets at a first uplink transmission time interval (TTI) length from a user device to a base station;
   in response to the user device receiving a reconfiguration command from a serving radio network controller, preventing transmission of any data packets from the user device for a predetermined time interval, wherein the predetermined time interval is a duration of time that is based on a number of hybrid automatic repeat request (HARQ) processes currently running; and
   after the predetermined time interval, transmitting second data packets at a second uplink TTI length from the user device to the base station, where the second uplink TTI length is different from the first uplink TTI length.

2. The method of claim 1, wherein the first uplink TTI length is 2 ms and the second uplink TTI length is 10 ms.

3. The method of claim 1, further comprising initiating, in response to receiving the reconfiguration command, a synchronous reconfiguration of the uplink TTI length of the user device at a connection frame number at which the reconfiguration is to occur.

4. The method of claim 1, wherein the predetermined time interval is a time period in which a previously established maximum number of transmissions with the first uplink TTI length occurs.

5. The method of claim 1, wherein the predetermined time interval is at least one of a time period in which all retransmitted first data packets have been positively acknowledged or a time period in which a previously established maximum number of first data packet transmissions is reached.

6. The method of claim 1, further comprising:
   retransmitting unsuccessfully received first data packets as second data packets using the second uplink TTI length.

7. The method of claim 6, further comprising:
   clearing hybrid automatic repeat request (HARQ) buffers of the base station for HARQ processes having pending retransmissions of first data packets.

8. The method of claim 7, wherein clearing is performed subsequent to receipt of a last indication of receipt for the first data packets.

9. The method of claim 1, performed as a result of executing program instructions stored in a memory medium of the user equipment.

10. The method of claim 1, further comprising: receiving, by the user device, acknowledgements from the base station that indicate receipt or non-receipt of the first data packets.

11. The method of claim 10, wherein an indication of receipt of a second data packet is received at the user device subsequent to receipt of an acknowledgement for a last first data packet.

12. The method of claim 1, where the reconfiguration command reconfigures the uplink TTI length from the first uplink TTI length to the second uplink TTI length.

13. The method of claim 1, where the first uplink TTI length is 10 ms and the second uplink TTI length is 2 ms.

14. An apparatus, comprising:
   a transmitter configurable to transmit first data packets at a first uplink transmission time interval (TTI) length to a base station;
   a receiver configurable to receive a reconfiguration command from a serving radio network controller; and
   a processor configurable, in response to receipt of the reconfiguration command, to prevent transmission of any data packets from the apparatus for a predetermined time interval, wherein the predetermined time interval is a duration of time that is based on a number of hybrid automatic repeat request (HARQ) processes currently running, said processor further configurable to enable, after the predetermined time interval, transmission of second data packets at a second uplink TTI length from the apparatus to the base station, where the second uplink TTI length is different from the first uplink TTI length.

15. The apparatus of claim 14, where in response to receipt of the reconfiguration command said processor is further configurable to initiate a synchronous reconfiguration of the uplink TTI length at a connection frame number at which the reconfiguration is to occur.

16. The apparatus of claim 14, where the first uplink TTI length is 10 ms and the second uplink TTI length is 2 ms.

17. The apparatus of claim 14, where the receiver is further configurable to receive at least acknowledgements from the base station that indicate receipt or non-receipt of the first data packets and where an indication of receipt of a second data packet is received subsequent to receipt of an acknowledgement for a last first data packet.

18. The apparatus of claim 14, where the predetermined time interval is a time period in which a previously established maximum number of transmissions with the first uplink TTI length occurs.

19. The apparatus of claim 14, where the predetermined time interval is at least one of a time period in which all retransmitted first data packets have been positively acknowledged or a time period in which a previously established maximum number of first data packet transmissions is reached.

20. The apparatus of claim 14, said processor further configurable to retransmit unsuccessfully received first data packets as second data packets using the second uplink TTI length.

21. The apparatus of claim 14, embodied as a user equipment operable with a high speed packet uplink access air interface.

22. The apparatus of claim 14, where the reconfiguration command reconfigures the uplink TTI length from the first uplink TTI length to the second uplink TTI length.

* * * * *